F. J. FLACK.
AUTOMOBILE LOCK.
APPLICATION FILED JULY 28, 1916.
1,268,225.
Patented June 4, 1918.
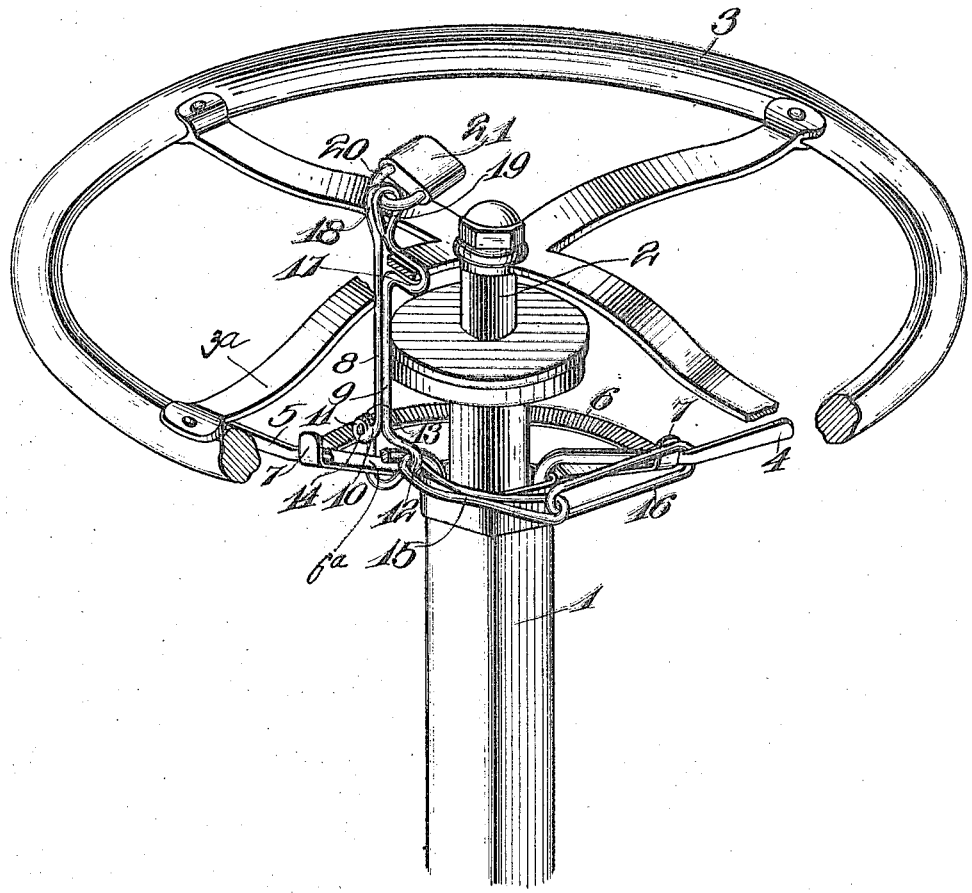
Ferdinand J. Flack
INVENTOR.
BY
ATTORNEYS.

UNITED STATES PATENT OFFICE.

FERDINAND J. FLACK, OF EAST CHICAGO, INDIANA.

AUTOMOBILE-LOCK.

1,268,225. Specification of Letters Patent. Patented June 4, 1918.

Application filed July 28, 1916. Serial No. 111,848.

*To all whom it may concern:*

Be it known that I, FERDINAND J. FLACK, a citizen of the United States, residing at East Chicago, in the county of Lake and State of Indiana, have invented new and useful Improvements in Automobile-Locks, of which the following is a specification.

This invention relates to devices for preventing the unauthorized driving or towing of automobiles and has as its object to provide a simple device of this character which may be readily applied to the steering wheel, spark lever, and throttle lever of any ordinary automobile, the device when applied preventing operation of either of the levers mentioned as well as preventing turning of the steering wheel.

It is one aim of the invention to provide a device of the class described so constructed that it may be conveniently carried, may be readily applied and removed whenever desired without the use of tools, and will, for its application and removal require no alteration in the construction of any part of the steering gear.

It is another aim of the invention to so construct the device that the same may be placed upon the market devoid of any key controlled locking device so that any desired type of padlock may be employed in connection therewith to suit the fancy of the purchaser. Incidentally, of course, the cost of manufacture is materially reduced.

In the accompanying drawings:

The figure represents a perspective view of the device, partly broken away, embodying the present invention in use.

In the drawing the numeral 1 indicates the steering column of the steering gear, 2 the steering post, and 3 the steering wheel. The spark control lever is indicated by the numeral 4 and the throttle lever by the numeral 5, the segment for holding these levers in their adjusted positions being indicated by the numeral 6, and the lever stops being indicated by the numeral 7, it being understood that when the levers are in engagement with their respective stops they are in cut-off position and that if means is provided for preventing their movement from such position, the machine cannot be driven in the usual manner. Likewise, the fact will be appreciated that if the steering wheel is held against rotation the machine cannot be towed with any degree of success to the parties attempting to surreptitiously use the machine. Therefore, as pointed out hereinbefore, the present invention aims to provide means for locking both the throttle and spark control levers and also the steering wheel in such manner that none of these parts can be manipulated.

The device embodying the present invention includes a pair of pivotally connected members one of which includes a shank 8 and the other a shank 9. The shank 8 is provided with a laterally turned or offset lower end portion 10 terminating in a pivot ear 11, and the shank 9 is in like manner provided with a laterally turned or offset lower end portion 12 terminating in a pivot ear 13. A pivot pin 14 is fitted through openings in the ears 11 and 13 and serves to connect the shanks 8 and 9 for relative pivotal movement. The laterally turned lower end portions 10 and 12 of the two shanks 8 and 9 encircle the throttle lever 5 and the end portion 6ª of the segment 6 in the manner clearly shown in the drawing. A link 15 is engaged with the portion 12 of the shank 9 and connected to this link is another link indicated by the numeral 16, the latter link being engaged with the handle portion of the spark lever 4 outside the adjacent stop 7, so that the latter serves to limit the inward movement of the link on the throttle lever. After the portion 10 of the shank 8 has been engaged with the throttle lever and the link 16 has been engaged with the spark lever in the manner shown, the members of the locking device are swung upon their pivot 14 so as to bring their shanks 8 and 9 together after which the members are locked in this relative position in a manner which will now be explained.

The members of the device are of such length that when positioned as shown in the drawing their outer ends will extend beyond the spokes 3ª of the steering wheel 3, and the shank 9 is formed with an outwardly bowed portion 17 a short distance from its outer end, to embrace one of said spokes, the outer end portion of the shank 8 extending across the opposite edge of said spoke. The two shanks are formed at their outer extremities with eyes 18 and 19 respectively for the engagement of the shackle 20 of any suitable type of padlock 21.

From the foregoing description of the invention it will be understood that when the device has been properly applied the spark control and throttle levers will be secured against manipulation as will also the steering wheel.

It will further be understood that any suitable lock may be employed in connection with the device, and also that the number of links connecting the shank 9 with the throttle lever may be varied.

I claim:

1. An automobile lock comprising a pair of complementary members pivotally connected at one end, and locking means applied to the other ends of the members, between which members one of the spokes of the steering wheel and one of the control levers are held, and a locking means engageable with the other control lever and having a connection with one of the aforesaid members.

2. An automobile lock comprising a pair of complementary members pivotally connected at one end, and locking means applied to the other ends of the members, between which members one of the spokes of the steering wheel and one of the control levers are held, and a link straddling the other control lever and having a connection with one of the aforesaid members.

3. In an automobile lock, the combination with a steering wheel and spark and throttle levers, of a shackle adapted to engage said spark lever, other shackles connected therewith adapted to engage the throttle lever and one arm of the steering wheel, and means whereby said last named shackles may be locked to render both levers and the steering wheel immovable.

In testimony whereof I affix my signature.

FERDINAND J. FLACK.

Copies of this patent may be obtained for five cents each, by addressing the "Commissioner of Patents, Washington, D. C."